US011831805B2

(12) United States Patent
Chavan

(10) Patent No.: US 11,831,805 B2
(45) Date of Patent: Nov. 28, 2023

(54) SYSTEM AND METHOD FOR TRANSMITTING AND RECEIVING MULTIMEDIA CONTENT BETWEEN THE CALLER AND THE CALLEE DURING RING TIME OF A VOICE CALL

(71) Applicant: Rajesh Kishanrao Chavan, Mumbai (IN)

(72) Inventor: Rajesh Kishanrao Chavan, Mumbai (IN)

(73) Assignee: Rajesh Kishanrao Chavan, Mumbai (IN)

( * ) Notice: Subject to any disclaimer, the term of this patent is extended or adjusted under 35 U.S.C. 154(b) by 110 days.

(21) Appl. No.: 17/603,525

(22) PCT Filed: Apr. 15, 2020

(86) PCT No.: PCT/IB2020/053531
§ 371 (c)(1),
(2) Date: Oct. 13, 2021

(87) PCT Pub. No.: WO2020/212854
PCT Pub. Date: Oct. 22, 2020

(65) Prior Publication Data
US 2022/0210270 A1 Jun. 30, 2022

(51) Int. Cl.
*H04M 3/436* (2006.01)
*H04L 65/1069* (2022.01)
*H04W 4/16* (2009.01)

(52) U.S. Cl.
CPC ...... *H04M 3/4365* (2013.01); *H04L 65/1069* (2013.01); *H04W 4/16* (2013.01); *H04M 2203/2038* (2013.01); *H04M 2203/351* (2013.01)

(58) Field of Classification Search
CPC ....... H04M 3/4365; H04M 2203/2038; H04M 2203/351; H04M 3/436; H04L 65/1069; H04W 4/16
See application file for complete search history.

(56) References Cited

U.S. PATENT DOCUMENTS

| 2007/0047728 | A1 | 3/2007 | Raju et al. |
| 2007/0207782 | A1 | 9/2007 | Tran |
| 2009/0191852 | A1 | 7/2009 | David et al. |
| 2010/0191608 | A1 | 7/2010 | Mikkelsen et al. |

(Continued)

FOREIGN PATENT DOCUMENTS

WO       2018116310 A1    6/2018

OTHER PUBLICATIONS

Aug. 14, 2020—(WO) International Search Report and Written Opinion—App PCT/IB2020/053531.

*Primary Examiner* — Minjung Kim
(74) *Attorney, Agent, or Firm* — Banner & Witcoff, Ltd.

(57) ABSTRACT

Systems and methods are described for transmitting and receiving a multimedia content to and fro between a caller mobile device and a callee mobile device in which the multimedia content is from the device of the users involved during ring time of a voice call, streaming live and in real time, and not from any third party multimedia storage server. An aspect of the present disclosure also states that the callee can also reply to the caller by transmitting multimedia content to the caller during the ring time of the voice call, streaming live and in real time.

11 Claims, 6 Drawing Sheets

(56) References Cited

U.S. PATENT DOCUMENTS

| | | | |
|---|---|---|---|
| 2013/0034220 A1* | 2/2013 | Ozeri | H04M 3/02 |
| | | | 379/142.06 |
| 2015/0086000 A1* | 3/2015 | Goldstein | H04M 3/42051 |
| | | | 379/142.04 |
| 2016/0330333 A1* | 11/2016 | Brown | H04W 4/18 |

* cited by examiner

SYSTEM AND METHOD FOR TRANSMITTING AND RECEIVING MULTIMEDIA CONTENT BETWEEN THE CALLER AND THE CALLEE DURING RING TIME OF A VOICE CALL

CROSS-REFERENCE TO RELATED APPLICATIONS

The present application is a U.S. National Phase of International Application No. PCT/IB2020/053531, filed on Apr. 15, 2020, designating the United States of America, which claims priority to Indian Patent Application No. 201921015025, filed on Apr. 15, 2019. This application claims priority to and the benefit of the above-identified applications, which are both fully incorporated by reference herein in their entireties.

TECHNICAL FIELD

The present disclosure relates to the field of communication networks. In particular, the present disclosure provides systems and methods for transmitting multimedia content on a callee mobile device during ring time of the voice call, streaming live and in real time. The present disclosure also states that the callee can also reply or transmit multimedia content to the caller during the ring time of the voice call, streaming live and in real time. The present disclosure also mentions to provide system and method for transmitting and receiving multimedia content to and fro between caller mobile device and callee mobile device in which the multimedia content is from the device of the users involved during ring time of a voice call, streaming live and in real time, without using any third party source or storage server.

The server used by the technology/application is just a medium of connection for transmitting and receiving multimedia content between two individual communication devices. The multimedia content is sourced from user device and not from any third party source or storage device.

The present disclosure also states that the technology applied makes changes in the execution of the hardware of the communication devices so that the call process and data channel can work simultaneously.

The present disclosure also states that this technology/application/software is not limited to mobile communication devices but also all kind of fixed and wireless devices like tabs, phablets, laptop, computer etc. This technology/application/software can also be applied to all present and future communication technology, software and applications.

BACKGROUND

The background description includes information that may be useful in understanding the present invention. It is not an admission that any of the information provided herein is prior art or relevant to the presently claimed invention, or that any publication specifically or implicitly referenced is prior art.

Computing devices such as mobile phones, telephone devices, smart devices and the like have been evolved in recent years to encompass a variety of functions and different features. One of the features pertains to alerts and notifications to a user on reception of call or message. Recently, more features have become available that permit a user to download desired notification and alert tones from a large selection available on different web sites on the Internet. With advancement of said computing devices, alerts and notifications can be personalized based on personal taste of the receiver and said notifications can be created by playing a sound (tune, series of beeps, etc) and by displaying visual information (text, image, multimedia etc.).

Further, a technique has been developed in the past that enables a telecommunications terminal to notify a user on the arrival of a message via an acoustic or visual signal whose properties are based on one or more attributes of the message. In an aspect of the said technique values of one or more properties of a notification tone (e.g., tempo, volume, pitch, rhythm, etc.) can be set based on one or more attributes of an incoming message (e.g., who the sender of the message is, a priority associated with the message, a subject associated with the message, the semantic content of the message, the location from which the message was sent, etc.). Thus, said technique can indicate the receiver about the subject-matter of the message. However, currently there is no such technique that can pre-indicate the receiver of a call about the subject-matter of the call.

There is therefore a need in the art to provide systems and methods that can enable the user to receive a pre-indication regarding relevancy of the call. There is a further need in the art to develop a technique that can enable the caller to indicate objective/intention/purpose of the call to the callee through a notification or alert tone.

OBJECTS OF THE PRESENT DISCLOSURE

It is a general object of the present disclosure to provide system and method for transmitting multimedia content from a caller mobile device to a callee mobile device during ring time of the voice call streaming live and in real time.

It is another object of the present disclosure to provide system and method for transmitting and receiving multimedia content to and fro between caller mobile device and callee mobile device in which the multimedia content is from the device of the users involved during ring time of a voice call, streaming live and in real time without using any content from the third party sources or storage server.

It is a another object of the present disclosure to provide system and method for transmitting multimedia content from a caller mobile device to a callee mobile device during ring time of the voice call that aids the caller to indicate objective/intention/purpose of the call to the callee.

It is a another object of the present disclosure to provide system and method for transmitting multimedia content from a caller mobile device to a callee mobile device during ring time of the voice call that enables the callee to be aware of the relevancy of the voice call that aids in deciding whether to receive the call or not.

It is a another object of the present disclosure to provide system and method for transmitting multimedia content from a caller mobile device to a callee mobile device during ring time of the voice call that reduces curiosity of the callee regarding subject-matter of the call when he/she misses the voice call.

It is a another object of the present disclosure to provide system and method for transmitting real time and live multimedia content from a caller mobile device to a callee mobile device during ring time of the voice call.

It is a another object of the present disclosure to provide system and method for transmitting multimedia content from a caller mobile device to a callee mobile device during ring time of the voice call that is cost and time effective.

It is another object of the present disclosure to provide system and method for replying to caller's multimedia content by transmitting multimedia content from a callee mobile device to a caller mobile device during ring time of the voice call that aids the callee to indicate the caller that the objective/intention/purpose of the call is understood by the callee.

It is another object of the present disclosure to provide system and method for replying to caller's multimedia content by transmitting multimedia content from a callee mobile device to a caller mobile device during ring time of the voice call that enables the callee to reply appropriately after understanding the relevancy of the voice call.

It is another object of the present disclosure to provide system and method for replying to caller's multimedia content by transmitting multimedia content from a callee mobile device to a caller mobile during ring time of the voice call that reduces curiosity of the caller regarding why the callee is not receiving the voice call.

It is another object of the present disclosure to provide system and method for replying to caller's multimedia content by transmitting multimedia content from a callee mobile device to a caller mobile during ring time of the voice call enables the callee to make aware the caller of the situation that the callee is involved in.

It is another object of the present disclosure to provide system and method for transmitting and receiving multimedia content to and fro between caller mobile device and callee mobile device with the data channel established by means of a common technology/application that can be configured in said caller mobile device and said callee mobile device, said technology/application being activated during the ring time of the voice call, and upon said activation, technology/application configured at the caller mobile device can attempt to create the channel simultaneously along with call process by modifying the commands that executes the mobile device hardware to activate data channel and call process together; while connecting with the technology/application configured at the callee mobile device.

SUMMARY

Systems and methods are described for transmitting a multimedia content from a caller mobile device to a callee mobile device during ring time of a voice call, streaming live and in real time. It also describes systems and methods that enables the callee to reply to the caller by transmitting a multimedia content from a callee mobile device to a caller mobile device during ring time of a voice call, streaming live and in real time.

An aspect of the present disclosure pertains to a system including a non-transitory storage device having embodied therein one or more routines operable to transmit multimedia content from the caller mobile device to the callee mobile device during ring time of the voice call; and one or more processors coupled to the non-transitory storage device and operable to execute the one or more routines, wherein the one or more routines include a call initiation module, which when executed by the one or more processors, initiates the voice call through a cellular network, from the caller mobile device, to the callee mobile device; a data channel establishment module, which when executed by the one or more processors, establishes a data channel over a data network between said caller mobile device and said callee mobile device, said data channel being established during ring time of the voice call and is disconnected after voice call-based connection is established between the caller mobile device and the callee mobile device; and a data channel based multimedia content transmission module, which when executed by the one or more processors, transmits, from the caller mobile device, multimedia content over the established data channel.

In an embodiment, the data channel can be established by means of a common technology/application that can be configured in said caller mobile device and said callee mobile device, said technology/application being activated during the ring time of the voice call, and upon said activation, technology/application configured at the caller mobile device can attempt to create the data channel with the callee mobile device by connecting with the technology/application configured at the callee mobile device.

In an embodiment, the data channel established by means of a common technology/application that can be configured in said caller mobile device and said callee mobile device, said technology/application being activated during the ring time of the voice call, and upon said activation, technology/application configured at the caller mobile device can attempt to create the data channel simultaneously along with call process by modifying the commands that executes the mobile device hardware to activate data channel and call process together; while connecting with the technology/application configured at the callee mobile device.

In an embodiment, the callee can reply to caller's message by transmitting a multimedia message from the callee mobile device to the caller mobile device through the data channel established by means of a common technology/application that can be configured in said caller mobile device and said callee mobile device, said technology/application being activated during the ring time of the voice call, and upon said activation, technology/application configured at the caller mobile device can attempt to create the data channel with the callee mobile device by connecting with the technology/application configured at the callee mobile device.

In an embodiment, the caller and callee can register with said common technology/application in order to establish said data channel.

In an embodiment, the data channel can be established only when caller and callee are connected to each other over the technology/application.

In an embodiment, the data channel can be established only when phone number of the callee mobile device is present in a defined repository or is verified through an authentication mechanism.

In an embodiment, the data channel based multimedia content transmission module can transmit the multimedia content to a server operatively configured with the data network.

In an embodiment, establishment of said data channel over the data network and establishment of the voice call based connection over the cellular network is performed simultaneously without interfering with each other.

Another aspect of the present disclosure pertains to a method for transmitting multimedia content from a caller mobile device to a callee mobile device during ring time of a voice call streaming live and in real time, said method including steps of initiating, at a computing device, a voice call through a cellular network, from the caller mobile device, to the callee mobile device; establishing, by the computing device, a data channel over a data network between said caller mobile device and said callee mobile device, said data channel being established during ring time of the voice call and is disconnected after voice call-based connection is established between the caller mobile device and the callee mobile device; and transmitting, by the computing device, from the caller mobile device, multimedia content over the established data channel.

Another aspect of the present disclosure pertains to a method for transmitting multimedia content from a caller mobile device to a callee mobile device during ring time of a voice call streaming live and in real time, in which the multimedia content transmitted and received are from the user device and not from the cellular network operator or any third party source/server.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
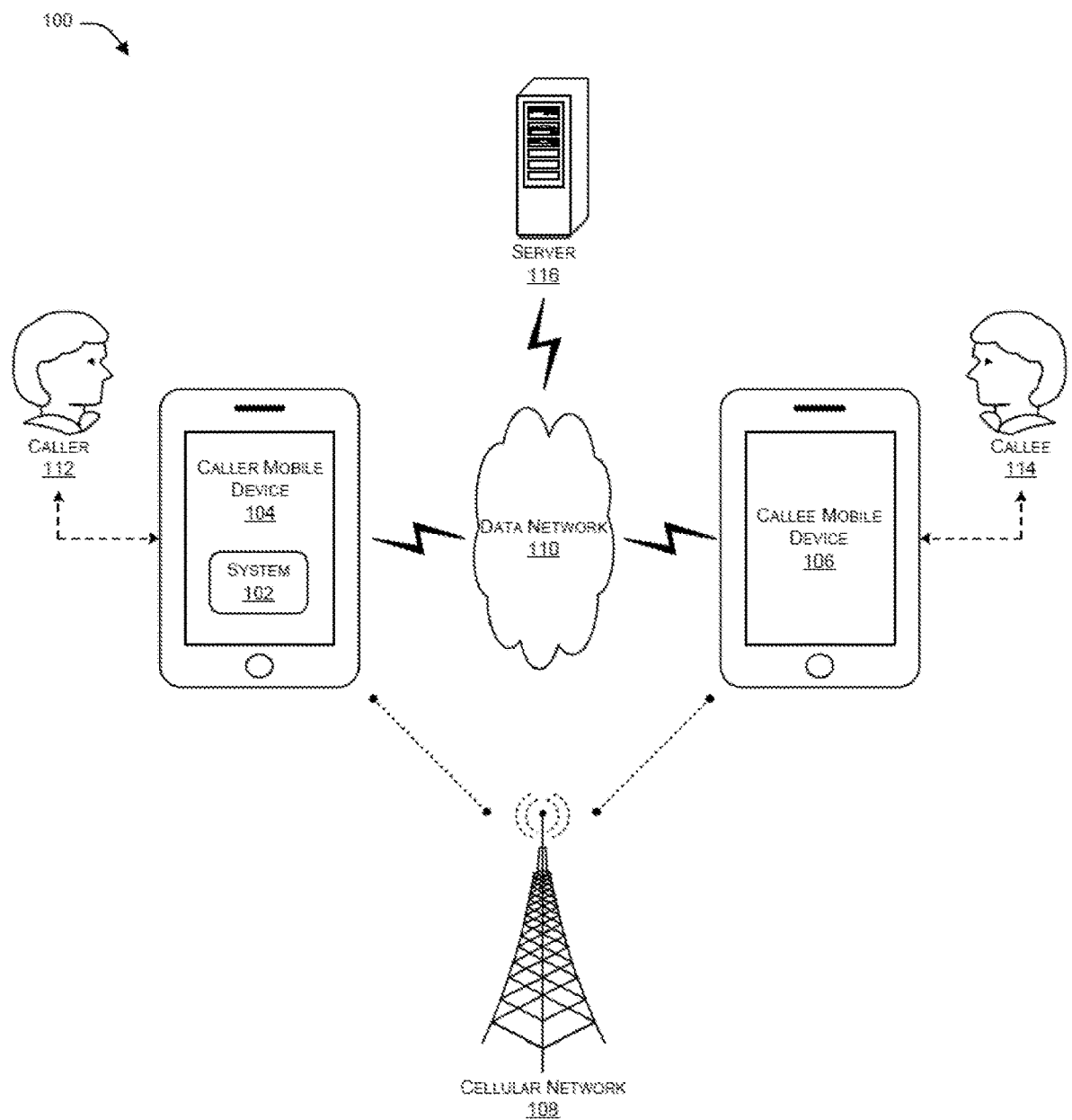
FIG. 1 illustrates an exemplary network architecture in which or with which proposed system can be implemented in accordance with an embodiment of the present disclosure.

In the following description, numerous specific details are set forth in order to provide a thorough understanding of embodiments of the present invention. It will be apparent to one skilled in the art that embodiments of the present invention may be practiced without some of these specific details.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Systems and methods are described for transmitting a multimedia content from a caller mobile device to a callee mobile device during ring time of a voice call, streaming live and in real time. The present disclosure also states that the callee can also reply or transmit multimedia content to the caller during the ring time of the voice call streaming live and in real time.

An aspect of the present disclosure pertains to a system including a non-transitory storage device having embodied therein one or more routines operable to transmit multimedia content from the caller mobile device to the callee mobile device during ring time of the voice call; and one or more processors coupled to the non-transitory storage device and operable to execute the one or more routines, wherein the one or more routines include a call initiation module, which when executed by the one or more processors, initiates the voice call through a cellular network, from the caller mobile device, to the callee mobile device; a data channel establishment module, which when executed by the one or more processors, establishes a data channel over a data network between said caller mobile device and said callee mobile device, said data channel being established during ring time of the voice call and is disconnected after voice call-based connection is established between the caller mobile device and the callee mobile device; and a data channel based multimedia content transmission module, which when executed by the one or more processors, transmits, and receives between the caller mobile device and callee mobile device, multimedia content over the established data channel.

In an embodiment, the data channel established by means of a common technology/application that can be configured in said caller mobile device and said callee mobile device, said technology/application being activated during the ring time of the voice call, and upon said activation, technology/application configured at the caller mobile device can attempt to create the data channel simultaneously along with call process by modifying the commands that executes the mobile device hardware to activate data channel and call process together with the callee mobile device connecting with the technology/technology/application configured at the callee mobile device.

In an embodiment, the data channel can be established by means of a common technology/technology/application that can be configured in said caller mobile device and said callee mobile device, said technology/technology/application being activated during the ring time of the voice call, and upon said activation, technology/technology/application configured at the caller mobile device can attempt to create the data channel with the callee mobile device by connecting with the technology/technology/application configured at the callee mobile device.

In an embodiment, the caller and callee can register with said common technology/technology/application in order to establish said data channel.

In an embodiment, the data channel can be established only when caller and callee are connected to each other over the technology/application.

In an embodiment, the data channel can be established only when phone number of the callee mobile device is present in a defined repository or is verified through an authentication mechanism.

In an embodiment, the data channel based multimedia content transmission module can transmit the multimedia content to a server operatively configured with the data network.

In an embodiment, establishment of said data channel over the data network and establishment of the voicecall based connection over the cellular network is performed simultaneously without interfering with each other.

Another aspect of the present disclosure pertains to a method for transmitting multimedia content from a caller mobile device to a callee mobile device during ring time of a voice call, said method including steps of initiating, at a computing device, a voice call through a cellular network, from the caller mobile device, to the callee mobile device; establishing, by the computing device, a data channel over a data network between said caller mobile device and said callee mobile device, said data channel being established during ring time of the voice call and is disconnected after voice call-based connection is established between the caller mobile device and the callee mobile device; and transmitting, by the computing device, from the caller mobile device, multimedia content over the established data channel.

Various objects, features, aspects and advantages of the inventive subject matter will become more apparent from the following detailed description of preferred embodiments, along with the accompanying drawing figures in which like numerals represent like components.

FIG. 1 illustrates an exemplary network architecture in which or with which proposed system can be implemented in accordance with an embodiment of the present disclosure.

As illustrated, in a network implementation, a caller 112 and a callee 114 can interact with each other through a caller mobile device 104 and a callee mobile device 106 (collectively referred to as mobile devices 104 and 106) respectively. The mobile devices 104 and 106 can be communicatively coupled through a cellular network 108 and a data network 110.

In an embodiment, proposed system 102 can be implemented using any or a combination of hardware components and software components such as a server, a computing system, a computing device, a security device and the like. In an embodiment, the system 102 can be implemented using the caller mobile device 104.

Further, the system 102 can interact with caller 112 and callee 114 through technology/applications residing on the mobile devices 104 and 106. In an implementation, the system 102 can be accessed by technology/applications configured with any operating system, including but not limited to, Android™, iOS™, and the like. Examples of the mobile devices 104 and 106 can include, but are not limited to, a smart phone, a portable computer, a personal digital assistant, a handheld device and the like. In a preferred embodiment, the mobile devices 104 and 106 are mobile phones of the respective caller 112 and callee 114.

In an embodiment, the cellular network 108 can include but are not limited to, a mobile cellular operator network, a land line telephone operator network, a mobile Internet such as GPRS/Broadband cellular network, GPRS/4g or LTE data connection/VoIP, a Wi-Fi enabled network and the like. Further, the data network 110 can be a network other that the cellular network 108. The data network 110 can be a wireless network, a wired network or a combination thereof that can be implemented as one of the different types of networks, such as Intranet, Local Area Network (LAN), Wide Area Network (WAN), Internet, and the like. Further, the network 110 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Technology/application Protocol (WAP), and the like.

In an embodiment, the system 102 can transmit multimedia content from the caller mobile device 104 to the callee mobile device 106 during ring time of a voice call (interchangeably referred to as call). The ring time of the voice call can be the time interval between connection and establishment of the voice call through the cellular network 108. When the callee mobile device 106 receives the call from the caller mobile device 104, the callee mobile device 106 rings on connection of the voice call. The time period for which the callee mobile device 106 rings such that the callee mobile device 106 can receive the voice call during said period can be the ring time of the voice call. The ring time of the voice call is generally of 30 seconds, that is, if the callee mobile device 106 does not receive the voice call from the caller mobile device 104 within 30 seconds, the voice call can get disconnected.

The multimedia content can be any or a combination of pre recorded/generated/stored voice, text, video, image, data files and the like. The multimedia content can also be live streaming or live video, voice, image, or a combination thereof of the caller 112. The multimedia content can be transmitted in real time that can indicate purpose, importance, urgency, mood and need of the communication or the voice call before the callee establishes/answers the voice call. It would be appreciated that the embodiments of the present disclosure are not limited to voice call and other calls such as a video call made through the cellular network 108 are well within the scope of the present disclosure.

In an embodiment, the transmitted multimedia content can be received by the callee mobile device 106 and can be used as a notification or pre-indication of an incoming voice call through the cellular network 108. The multimedia content can be transferred through the data network 110 without intervention of the cellular network 108. Also, the received multimedia content can be displayed on the callee mobile device 106. The callee 114 can also reject/silence the call or the notification containing the transmitted multimedia content. Further, the multimedia content can be stored in a memory associated with the callee mobile device 106 such that if the callee 106 is not able to access the multimedia content at the time of the voice call, the callee 114 can access the multimedia content subsequently when the callee 114 checks missed calls on his/her mobile device 106.

In an embodiment, the multimedia content transmitted by the caller mobile device 104 can be stored in a server 116 operatively configured with the data network 110. Thus, when data connectivity through the data network 110 is disabled at the callee mobile device 106 at the time of initiation of the call through the cellular network 108, the callee mobile device 106 can receive multimedia content as soon as the data connectivity through the data network 110 is enabled in the callee mobile device 106.

In an embodiment, the technology/application residing on mobile devices 104 and 106 used for implementing the system 102 can include a dialler to initiate calls. Further, the technology/application can be integrated with existing technology/applications residing in mobile devices 104 and 106 such as phone dialler, contacts, Google™ Voice Assistant, Apple™ Siri, Microsoft™ Cortana or any other Internet or device based technology/application.

Embodiments of the present disclosure can be enabled to utilize non-productive ringer time during/between call connection and establishment such that caller 112 can enjoy sending purpose, urgency or mood to the callee 114 even if the callee 114 is not able to receive the call or chose to not to answer the call. Thus the caller 112 can send and the callee 114 can acknowledge the purpose, urgency, mood of calls even when the callee 114 does not answer the call.

In an embodiment, the system 102 can enable the caller 112 to select a mood such as sad, happy, romantic, complain, apologetic, anger and the like. The mood can be indicated using predefined multimedia content that a caller 112 can choose to transmit before placing the voice call through the cellular network 108. To provide clarity such an embodiment can be explained by way of an example, for example, the caller 112 can select a happy mood that can be represented by yellow emoji and can be displayed on the callee mobile device 106 when a voice call is made from the caller mobile device 104 to the callee mobile device 106.

In an embodiment, the text included in the multimedia content can be colour coded to indicate importance, urgency and mood of the caller 112 to the callee 114. The multimedia content can be in the format of Graphic Interchange Format (GIF), or Emoticons or Graffiti images or any graphical or Animation content. Further, the multimedia content can include media files and documents that are stored on the caller mobile device.

Figure 2:
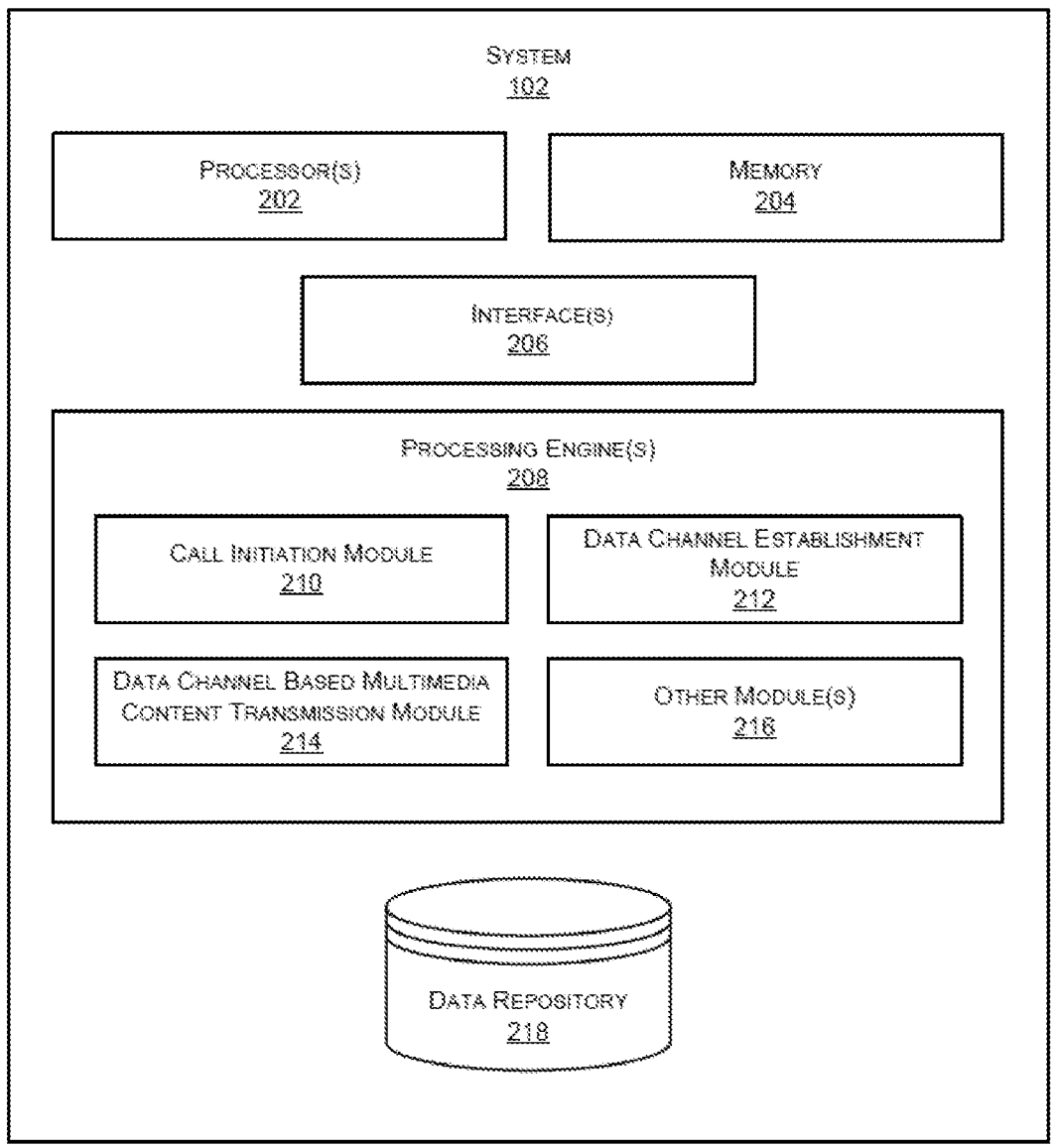
FIG. 2 illustrates exemplary functional modules of the proposed system in accordance with an exemplary embodiment of the present disclosure.

FIG. 2 illustrates exemplary functional modules of the proposed system in accordance with an exemplary embodiment of the present disclosure.

As illustrated, the system 102 can include one or more processor(s) 202. The one or more processor(s) 202 can be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204 of the system 102. The memory 204 can store one or more computer-readable instructions or routines, which may be fetched and executed to create or share the data units over a network service. The memory 204 can include any non-transitory storage device including, for example, volatile memory such as RAM, or non-volatile memory such as EPROM, flash memory, and the like.

The system 102 can also include an interface(s) 206. The interface(s) 206 may include a variety of interfaces, for example, interfaces for data input and output devices, referred to as I/O devices, storage devices, and the like. The interface(s) 206 may facilitate communication of the system 102 with various devices coupled to the system 102. The interface(s) 206 may also provide a communication pathway for one or more components of the system 102. Examples of such components include, but are not limited to, processing engine(s) 208 and data repository 218.

The processing engine(s) 208 can be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may include a processing resource (for example, one or more processors), to execute such instructions. In the present examples, the machine-readable storage medium may store instructions that, when executed by the processing resource, implement the processing engine(s) 208. In such examples, the system 102 can include the machine-readable storage medium storing the instructions and the processing resource to execute the instructions, or the machine-readable storage medium may be separate but accessible to system 102 and the processing resource. In other examples, the processing engine(s) 208 may be implemented by electronic circuitry. The data repository 218 can include data that is either stored or generated as a result of functionalities implemented by any of the components of the processing engine(s) 208.

In an example, the engine(s) 208 can include a call initiation module 210, a data channel establishment module 212, a data channel based multimedia content transmission module 214 and other module(s) 216. The other module(s) 216 can implement functionalities that supplement technology/applications or functions performed by the system 102 or the processing engine(s) 208.

In an embodiment, the call initiation module 210 can initiate a voice call from a caller mobile device to a callee mobile device through a cellular network. The call can be initiated when the caller dials a call from his/her mobile device. The mobile devices can be any computing devices such as mobile phones, tablets, smart phones, laptops, and the likes. While the call is initiated, the callee mobile device sends a request to the Base Transceiver Station (BTS)/Base Station Controller (BSC). The Mobile Switching Center (MSC) after confirmation from the BTS/BSC switches or connects the call to the callee. The callee can then establish/answer the call during ring time that generally a time period of 30 seconds.

In an embodiment, the data channel establishment module 212 can establish a data channel over a data network between the caller mobile device and the callee mobile device. While establishment of the data channel a data connection is established between the caller mobile device and the callee mobile device such that transmission of data packets can take place between the mobile devices. According to an embodiment of the present disclosure, the data channel can be established during ring time of the voice call, for instance, the data channel can be established as soon as a request to BSC is sent. Further, the established data channel can be disconnected after voice call-based connection is established between the caller mobile device and the callee mobile device such that the transmission of the data packets can take place only during ring time of the call. Also, if the voice call-based connection is not established that is the callee does not receive the call, the established data channel can be disconnected once the ring time concludes.

In an embodiment, the data channel establishment module 212 can establish the data channel over the data network simultaneously when the voicecall based connection over the cellular network is being established. For example, the establishment of the data channel can be performed as soon as the call initiation module 210 initiates the voice call by sending request to the BSC. Also, the data network and the cellular network are independent networks such that when the data channel is being established there can be no interference between the two networks.

In an embodiment, when the data channel is established, the data channel based multimedia content transmission module 214 can transmit multimedia content from the caller mobile device to the callee mobile device over the established data channel. Therefore, during the ring time of the voice call, the callee can receive multimedia content from the caller that can be used as a notification or an alert pertaining to the voice call through voice call-based connection that can be established though a cellular network.

In an embodiment, in an event when the callee mobile device is switched off or the data connection of the callee mobile device is disabled, the data channel based multimedia content transmission module 214 can transmit the multimedia content to a server operatively configured with the data network. Therefore, as soon as the callee mobile device is switched on or the data connection of the callee mobile device is enabled, the callee mobile device can receive the multimedia content transmitted by the caller mobile device during the ring time through the server.

In an embodiment, the system 102 can be implemented using an technology/application residing in mobile devices of the call and the callee. Therefore, the data channel can be established by means of a common technology/application that can be configured in the caller mobile device and the callee mobile device. In an embodiment, the technology/application can be activated during the ring time of the voice call and upon activation the technology/application that is configured at the caller mobile device can attempt to create the data channel with the callee mobile device by connecting with the technology/application configured at the callee mobile device.

Further, in an embodiment, the caller and callee can register with the technology/application. The registration of the caller and the callee can be based on the phone number pertaining to the caller and the callee respectively. While registration the system 102 can receive attributes of the caller and the callee that can include name, phone number, etc. in an embodiment, the system 102 can retrieve phone number from firmware installed on the mobile devices. Further, the system 102 can normalize the received phone number into an international standard that define format and length of phone numbers. Further, the normalized phone numbers pertaining to the caller or the callee can be stored in a data repository (also referred to as defined repository) configured with the server operatively configured with the data network.

In an embodiment, while registration, the system 102 can verify the association between the normalized phone number and the mobile device pertaining to the caller/callee via a loop back verification message that can be sent through any of a data network or a cellular network. For example, while registration verification of the mobile device pertaining to the caller/callee can be performed using one-time password (OTP) that can be obtained from the server configured with the data network.

In an aspect, the caller and the callee can be connected to each other over the technology/application. In an instance, the caller and the callee can be connected using the normalized phone numbers stored in the data repository that are included in the entries of phone directory of any or a combination of the caller mobile device and the callee mobile device. In another instance, the caller mobile device can be connected to the callee mobile device through a request generated by the caller that can be accepted by the callee using technology/application pertaining to the system 102 residing on the respective mobile devices.

Embodiments of the present disclosure can be used to make a call through a mobile device to plurality of mobile devices such that a caller can simultaneously call a plurality of users and can transmit multimedia content during the ring time. Thus, the embodiments of the present disclosure can be utilized by a company/institution/organization to send out communication to employees/members during the caller ring time.

In an embodiment, the data channel establishment module 212 can establish the data channel only when phone number of the callee mobile device is present in the data repository or is verified through an authentication mechanism. For example, when the caller initiates a call to the callee, the data channel establishment module 212 can check if the phone number of the callee is present in the data repository where all phone numbers of registered caller/callee are stored. Only when the phone number is present in the data repository, the caller can transmit the multimedia content to the callee. Further, the data channel establishment module 212 can use an authentication technique to verify if the caller and the callee are connected to each other over the technology/application. For example, if a user A is connected with user B and the user A is not connected with user C, the user A can transmit the multimedia content to user B, but the user A cannot transmit the multimedia content to user C.

In an embodiment, all employees/members of the company/organization/institution can be connected over the technology/application using the normalized phone numbers of the employees/members. Such that a communication can be sent to each individual member/employee during the ring time of the call. Embodiments of the present disclosure can be used to send a hooter/warning sound to multiple users simultaneously.

In an embodiment, the technology/application can provide a button to transmit a hooter/warning sound to a single or multiple mobile devices. Said button can be pre-programmed or can be pre-configured by the caller. The hooter/warning sound can be any loud sound or loud voice message that can be sent with a press of said button during the ring time of the voice call.

The technology/application residing on the caller mobile device can provide the caller various options to send messages, voice, video, etc. during ring time of the call. Further, the caller can be provided with an option to record and transmit the multimedia content. The transmitted multimedia content can be displayed through the technology/application residing on the callee mobile device during the call ringer. The received multimedia content can be stored in a memory configured with the callee mobile device such that the stored multimedia content can be subsequently accessed by the callee.

In an embodiment, the technology/application configured at the callee mobile device can enable the callee to reply through textual, graphical, audio, multimedia or/and audio-visual message or call during ring time of the call. Thus, the callee mobile device can reply to the caller in a similar manner during ring time of the voice call. Also, if the callee is busy or not able to receive the call, the multimedia content can be stored in the memory associated with the callee mobile device such that the multimedia content can be access later on. In an embodiment, the technology/application configured at the callee mobile device can also provide an option to reject/silence the call or the notification (multimedia content).

In an embodiment, even if the callee mobile device does not receive the multimedia content, but only receives voice call, the callee mobile device can respond/reply the call using the technology/application configured in the callee mobile device. For instance, if the caller makes a simple call over the cellular network (sending no multimedia content), the receiver can acknowledge the call by using the technology/application by replying or sending multimedia content over a data channel.

Figure 3:
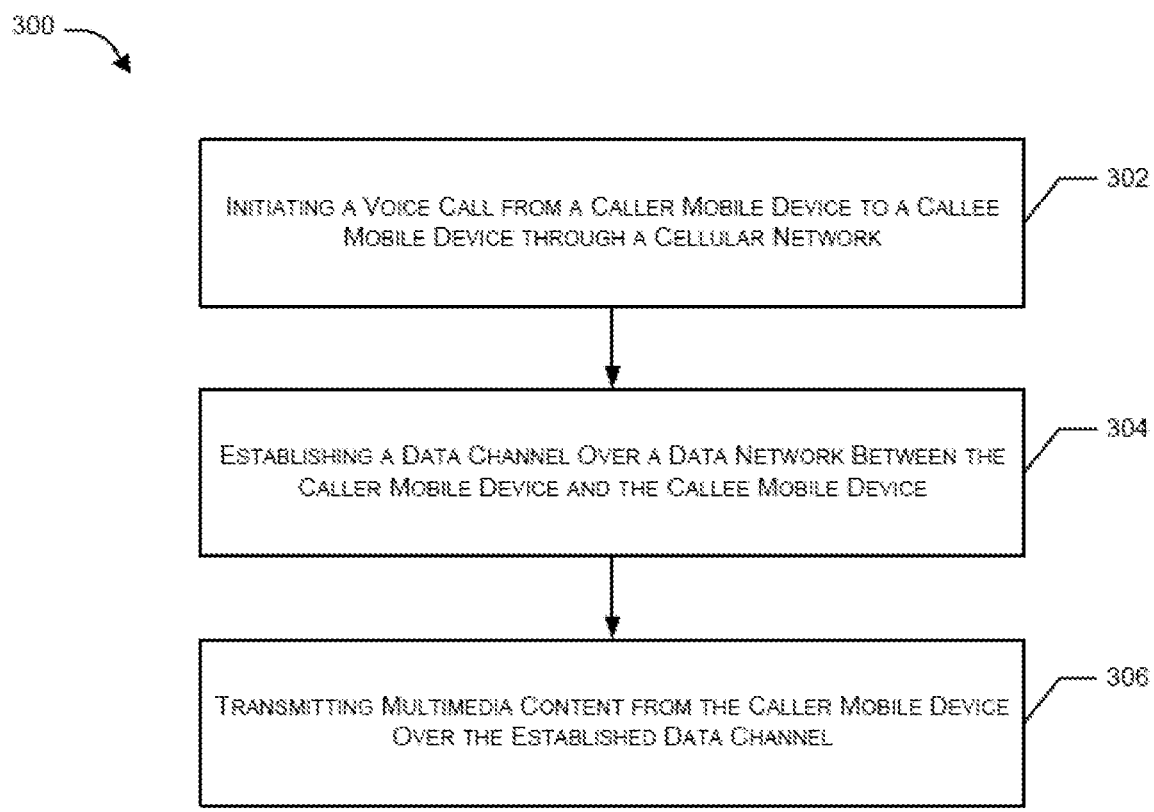
FIG. 3 is a flow diagram illustrating a process for transmitting multimedia content from the caller mobile device to a callee mobile device during ring time of the voice call in accordance with an embodiment of the present disclosure.

FIG. 3 is a flow diagram illustrating a process for transmitting multimedia content from the caller mobile device to a callee mobile device during ring time of the voice call in accordance with an embodiment of the present disclosure.

In an aspect, a method to transmit multimedia content from a caller mobile device to a callee mobile device during ring time of the voice call can include a step 302 pertaining to initiating a voice call from the caller mobile device to the callee mobile device through a cellular network.

The method can further include a step 304 pertaining to establishing a data channel over a data network between the caller mobile device and the callee mobile device. The data channel can be established during ring time of the voice call and can be disconnected when the callee answers the call that is a voice call-based connection is established between the caller mobile device and the callee mobile device;

The method can further include a step 306 pertaining to transmitting multimedia content from the caller mobile device over the established data channel. Thus, during ring time of the call the received multimedia content of the callee mobile device can be considered as a notification/alert for the call through cellular network.

In an embodiment, the establishment of the data channel can be performed by means of a common technology/application that can be configured in the mobile devices of the caller and the callee. The technology/application can be activated during the ring time of the voice call, and upon said activation, technology/application configured at the caller mobile device can attempt to create the data channel with the callee mobile device by connecting with the technology/application configured at the callee mobile device.

In an embodiment, the method can further include a step of registering a caller and a callee with said common technology/application in order to establish said data channel between the respective mobile devices of the caller and the callee. On registration, the phone number of the caller/callee can be stored in a defined repository.

In an embodiment, the data channel can be established only when phone number of the callee mobile device is present in a defined repository or is verified through an authentication mechanism.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 4A:
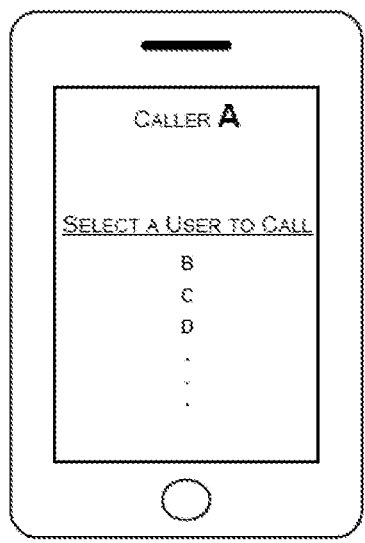
FIGS. 4A-C illustrate exemplary representations of caller mobile device in accordance with an embodiment of the present disclosure.
Figure 4B:
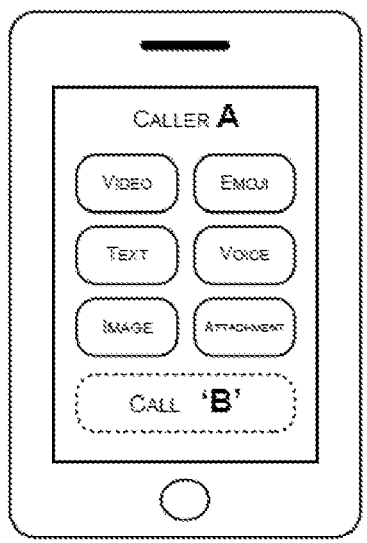
Figure 4C:
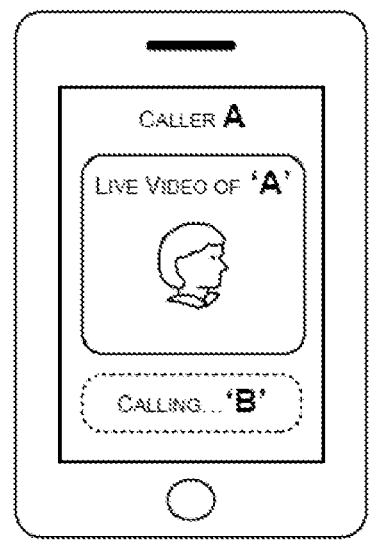

FIGS. 4A-C illustrate exemplary representations of caller mobile device in accordance with an embodiment of the present disclosure.

As illustrated in FIG. 4A, in an implementation, a caller A can select a user from a list of users contained in phone directory of the mobile device of the caller to initiate a call through a cellular network.

As illustrated in FIG. 4B, the caller A can select a user B to initiate a call. Caller A can be provided a variety of options to share multimedia content with caller B during ring time of the call. For example, by selecting "video", the caller A can share live video; by selecting "emoji", the caller A can share an emoticon; by selecting "voice", the caller A can share live voice, by selecting "text", the caller A can share text, by selecting "image", the caller A can share instant image and by selecting "attachment", the caller A can share pre stored documents and files.

As illustrated in FIG. 4C, in an implementation, by selecting "video" the caller A can share live video during ring time of the call made to caller B. Said live video can act as a notification/alert for an incoming call.

Figure 5:
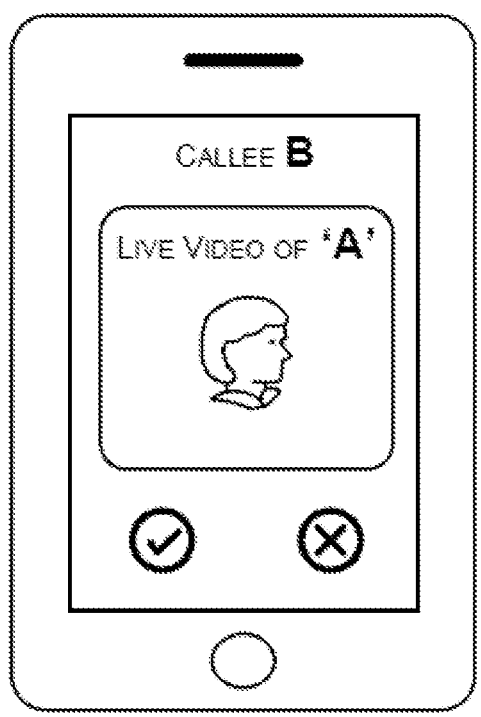
FIG. 5 illustrates an exemplary representation of callee mobile device in accordance with an embodiment of the present disclosure.

FIG. 5 illustrates an exemplary representation of callee mobile device in accordance with an embodiment of the present disclosure.

As illustrated in FIG. 5, in an embodiment, during ring time of the call, the live video transmitted by mobile device of the caller A can be received by the mobile device of the callee B. The live video can be in the form of a notification of the call that enables callee B to understand relevancy of the call from caller A. The callee B can be provided with an option to accept or reject the call.

Figure 6:
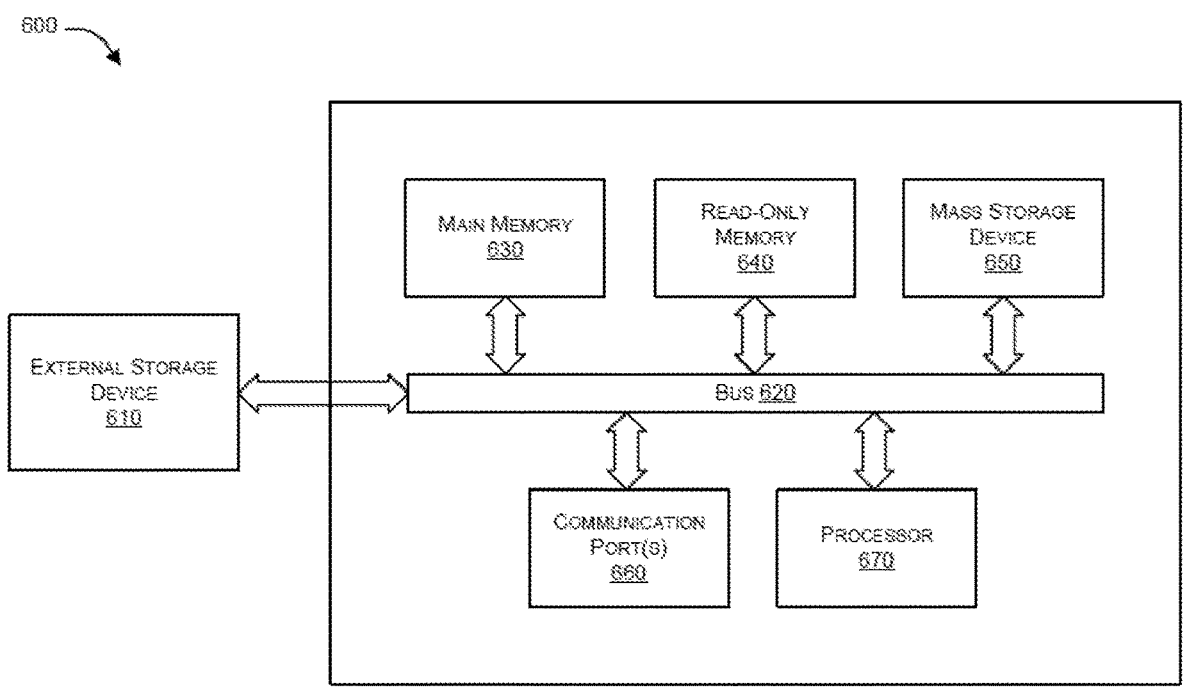
FIG. 6 illustrates an exemplary computer system in which or with which embodiments of the present invention can be utilized in accordance with embodiments of the present disclosure.

FIG. 6 illustrates an exemplary computer system in which or with which embodiments of the present invention can be utilized in accordance with embodiments of the present disclosure.

As shown in FIG. 6, computer system includes an external storage device 610, a bus 620, a main memory 630, a read only memory 640, a mass storage device 650, communication port 660, and a processor 670. A person skilled in the art will appreciate that computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention. Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides system and method for transmitting multimedia content from a caller mobile device to a callee mobile device during ring time of the voice call.

The present disclosure also states that the callee can also reply or transmit multimedia content to the caller during the ring time of the voice call streaming live and in real time.

The present disclosure also states that the multimedia content transmitted and received to and fro between the caller mobile device and the callee mobile device is from the user devices involved in communication during the ring time of voice call and not from third party sources or servers.

The present disclosure provides system and method for transmitting multimedia content from a caller mobile device to a callee mobile device during ring time of the voice call that aids the caller to indicate objective/intention/purpose of the call to the callee.

The present disclosure provides system and method for transmitting multimedia content from a caller mobile device to a callee mobile device during ring time of the voice call that enables the callee to be aware of the relevancy of the voice call that aids in deciding whether to receive the call or not.

The present disclosure provides system and method for transmitting multimedia content from a caller mobile device to a callee mobile device during ring time of the voice call that reduces curiosity of the callee regarding subject-matter of the call when he/she misses the voice call.

The present disclosure provides system and method for transmitting real time and live multimedia content from a caller mobile device to a callee mobile device during ring time of the voice call The present disclosure provides system and method for transmitting multimedia content to from a caller mobile device to a callee mobile device during ring time of the voice call that is cost and time effective.

It is another object of the present disclosure to provide system and method for replying to caller's multimedia content by transmitting multimedia content from a callee mobile device to a caller mobile during ring time of the voice call that aids the callee to indicate the caller that the objective/intention/purpose of the call is understood by the callee.

It is another object of the present disclosure to provide system and method for replying to caller's multimedia content by transmitting multimedia content from a callee mobile device to a caller mobile during ring time of the voice call that enables the callee to reply appropriately after understanding the relevancy of the voice call.

It is another object of the present disclosure to provide system and method for replying to caller's multimedia content by transmitting multimedia content from a callee mobile device to a caller mobile during ring time of the voice call that reduces curiosity of the caller regarding why the callee is not receiving the voice call.

It is another object of the present disclosure to provide system and method for replying to caller's multimedia content by transmitting multimedia content from a callee mobile device to a caller mobile during ring time of the voice call enables the callee to make aware the caller of the situation that the callee is involved in.

I claim:

1. A system for transmitting real time and live multimedia content from a caller mobile device to a callee mobile device during ring time of a voice call, the system comprising:
   a non-transitory storage device; and
   one or more processors coupled to the non-transitory storage device and operable to:
   initiate, through a call initiation module when executed by the one or more processors, the voice call through a cellular network, from the caller mobile device to the callee mobile device;
   the system characterized in that comprising:
   a data channel establishment module, which when executed by the one or more processors, establishes a data channel over a data network between said caller mobile device and said callee mobile device,
   said data channel being established during ring time of the voice call and is disconnected after voice call based connection is established between the caller mobile device and the callee mobile device,
   wherein said data channel is established simultaneously along with call process by modifying command that executes mobile device hardware to activate said data channel and call process together;
   wherein said data channel is established only when phone number of the callee mobile device is present in a defined repository or is verified through an authentication mechanism, and
   wherein establishment of said data channel over the data network and establishment of the voice call based connection over the cellular network is performed simultaneously without interfering with each other; and
   a data channel based multimedia content transmission module, which when executed by the one or more processors, transmits and receives between the caller mobile device and callee mobile device,
   the real time and live multimedia content which originates from or is stored in said caller mobile device or said callee mobile device and not from any third party sources or servers, over the established data channel.

2. The system of claim 1,
   also includes method for replying to the voice call by transmitting multimedia content from said callee mobile device to said caller mobile during ring time of the voice call that aids the callee to indicate to the caller the reason for not answering his call.

3. The system of claim 2,
   wherein the caller and the callee register with said application/technology in order to establish said data channel.

4. The system of claim 2,
   wherein said data channel is established only when caller and callee are connected to each other over an application/technology.

5. The system of claim 1,
   wherein said data channel is established by means of application/technology that is configured in said caller mobile device and said callee mobile device, said application/technology being activated during the ring time of the voice call, and upon said activation, application configured at the caller mobile device attempts to create the data channel with the callee mobile device by connecting with the application/technology configured at the callee mobile device.

6. The system of claim 1, further comprising the data channel established by means of an application/technology that is configured in said caller mobile device and said callee mobile device, said application/technology being activated during the ring time of the voice call, and upon said activation, said application/technology configured at the caller mobile device creates the data channel simultaneously along with call process by modifying the command that executes mobile device hardware to activate said data channel and call process together; while connecting with the application/technology configured at the callee mobile device.

7. The system of claim 1, wherein the data channel based multimedia content transmission module transmits the real time and live multimedia content to a server operatively configured with the data network.

8. A method to transmit real time and live multimedia content from a caller mobile device during ring time of a voice call, said method comprising steps of:

initiating the voice call through a cellular network, from the caller mobile device to the callee mobile device;

establishing a data channel over a data network between said caller mobile device and said callee mobile device, said data channel being established during ring time of the voice call and is disconnected after voice call based connection is established between the caller mobile device and the callee mobile device, wherein said data channel is established only when phone number of the callee mobile device is present in a defined repository or is verified through an authentication mechanism, and wherein establishment of said data channel over the data network and establishment of the voice call based connection over the cellular network is performed simultaneously without interfering with each other; and transmitting from the caller mobile device, the real time and live multimedia content over the established data channel.

9. The method of claim 8, establishing the data channel is performed by means of application/technology that is configured in said caller mobile device and said callee mobile device, said application/technology being activated during the ring time of the voice call, and upon said activation, application configured at the caller mobile device attempts to create the data channel with the callee mobile device by connecting with the application/technology configured at the callee mobile device.

10. The method of claim 9, further comprising a step of registering the caller and the callee with said application/technology in order to establish said data channel.

11. The method of claim 9, further comprising the real time and live multimedia content which originates from or is stored in said caller mobile device or said callee mobile device and not from any third party sources or servers, over the established data channel.

* * * * *